Patented Jan. 18, 1927.

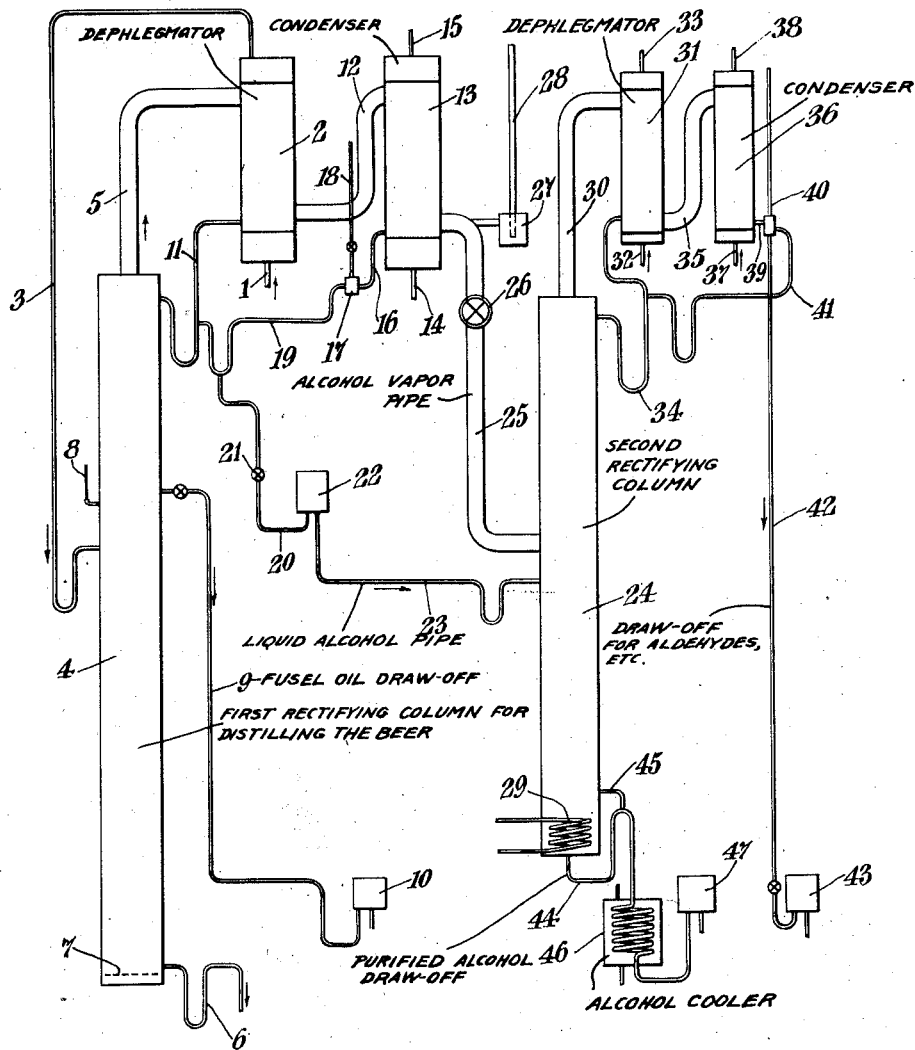

1,614,877

UNITED STATES PATENT OFFICE.

ELWOOD I. CLAPP, OF BALTIMORE, MARYLAND, ASSIGNOR TO U. S. INDUSTRIAL ALCOHOL CO., A CORPORATION OF WEST VIRGINIA.

PROCESS FOR THE DISTILLATION OF ALCOHOL.

Application filed January 10, 1925. Serial No. 1,597.

My invention relates particularly to a process designed for the production of alcohol whereby impurities may be readily eliminated and alcohol obtained having a high strength.

The object of my invention is to provide a process whereby alcohol substantially freed from its impurities, excepting water, and having a high strength, may be obtained. A further object is to provide a process for this purpose which is very economical owing to the fact that no water need be added except in the case of any steam injected in the first column. A further object is to obtain an alcohol having a uniform quality. Another object is to enable the process to be readily and accurately controlled. Still another object is to obtain a fusel oil and alcohol mixture which may be readily refined to produce refined fusel oil. Again, another object is to provide an installation for conducting the above process having a very low initial cost. Further objects of my invention will appear from the detailed description of the same hereinafter.

While my invention is capable of being carried out in many different ways, I shall describe only certain ways of conducting the same hereinafter, and while it is capable of being carried out with many different types of apparatus I have shown only one type of apparatus in the accompanying drawings, in which, The figure is a diagrammatic elevation of an apparatus which may be used in accordance with my invention.

For example, in carrying out my invention beer containing approximately 5 to 10% by volume of ethyl alcohol, is initially heated by passing the same from a supply pipe 1 to a dephlegmator 2 and thence by means of a trapped pipe 3 into a distilling column 4 which has a vapor outlet 5 leading to the dephlegmator 2 and a trapped draw-off pipe 6 for the slop. It will be understood that, if desired, the pipe 3 for conveying the beer to the column 4 may pass also through a preheater heated by means of the pipe 6. Live steam enters the column 4 from a pipe 7 and passes upwardly therefrom through the column. It is to be understood, however, that the source of heat might, instead, be a closed heater located at the bottom of the column for supplying indirect heat thereto. As the steam passes up the column 1 it removes the alcohol from the beer so that in the countercurrent of liquid flowing down the column the alcohol is removed to an increasing extent until the slop flows out from the pipe 6 substantially free from alcohol. Just above the inlet from the pipe 3 to the column 4 there is a thermometer 8 for observing the temperature at this point, which should be maintained at approximately 85° C., inasmuch as it is necessary to maintain such temperature at this point in the column in order to obtain alcohol vapors having a strength of 95 to 96% at the top of the column after passing through the upper portion of the column 4, which acts as a rectifying unit. Also, just above the beer inlet it is found that the fusel oil or high boiling impurities accumulate to their greatest concentration in the column and, accordingly, I have at that point provided a valved draw-off pipe 9 which is liquid-sealed and communicates with a tail-box 10, from which the fusel oil containing some alcohol is drawn off. It will be understood that, if desired, this fusel oil by-product containing alcohol may be further fractionated in a still to produce refined fusel oil. The condensate from the dephlegmator 2 is returned to the top of the column 1 by a trapped pipe 11 while the uncondensed vapors pass out by a pipe 12 to a condenser 13, which is cooled by water supplied by an inlet pipe 14 and an outlet pipe 15. The condensate from the condenser 13 is drawn off by a pipe 16 through a flow box 17 having a valved vent 18 and passes thence to a pipe 19, having a trap which is connected to the pipe 11 from the dephlegmator 2, said trap having a draw-off pipe 20, provided with a valve 21, leading to a tail-box 22. The portion of the condensate which reaches the tail-box 22 is conveyed then by a trapped pipe 23 to a second rectifying column 24. Also, any vapors which are not condensed in the condenser 13 are conveyed by a vapor pipe 25 to the column 24.

The vapor pipe 25 has a valve 26 to control or shut off the same as desired. The temperature of 85° C., as indicated by the thermometer 8 is maintained by controlling the valve 21 or by controlling the flow of water through the pipe 14 to the condenser 13, or both. That is to say, if the temperature rises above 85° C. this shows that a greater amount of liquid should be refluxed to the column 4 and this may be provided for by closing the valve 21 to a greater extent or by increasing the flow of cooling water through the pipe 14, or both. A safety liquid seal 27 is also connected to the pipe 25, said seal having a vent-pipe 28 so as to take care of any undue amount of vacuum or pressure which might at times be present in the apparatus. Indirect heating for the column 24 is provided by a steam coil 29. As a result the aldehydes and other low boiling constituents, and including some alcohol, pass out of the column 24 by a vapor pipe 30 to a dephlegmator 31 cooled with a current of water by means of an inlet pipe 32 and an outlet pipe 33, the condensate being returned by a trapped pipe 34 to the column 24. The uncondensed vapors then pass by a pipe 35 to a condenser 36 cooled by a current of water with the aid of an inlet pipe 37 and an outlet pipe 38. The condensate leaves the condenser 36 by a pipe 39 having a vent 40 to permit the escape of uncondensed gases, a trapped pipe 41 to convey part of the condensate through the pipe 34 to the column 24 and a main draw-off pipe 42 for the aldehydes and low boiling constituents, including some alcohol. These low boilers pass through a tail-box 43 from which they may be drawn off as desired. The purified ethyl alcohol having a strength of 95 to 96% is conveyed away from the column 24 by a trapped pipe 44 having a vent connection 45 to the column, the alcohol being thence conveyed to a cooler 46 and from the cooler to a tail-box 47 to permit the withdrawal therefrom, as desired.

In the operation of my invention it will be understood that the process may be carried out in three different ways: first, by conveying vapors of alcohol, etc. through the pipe 25 to the column 24 and no liquid from the pipe 23 to said column; second, by conveying merely the liquid through the pipe 23 and no vapors through the pipe 25; and third, by conveying both vapors through the pipe 25 and liquid through the pipe 23 to the column 24.

In the first mode of operation, that is to say by conveying vapors through the pipe 25 and no liquid through the pipe 23, it will be understood that the amount of water fed into the condenser 13 by the pipe 14 will be increased to such an extent as to provide the necessary amount of condensate to be returned to the column 4, thus maintaining the proper temperature therein as above referred to. The apparatus is controlled accordingly by controlling the flow of cooling water to the condenser 13. There is, thus, a great saving in steam due to avoiding the revaporization of condensed alcohol. However, very careful control is required in operating the process in this way as there is a lag between the adjustment and the amount of condensate produced.

In the second mode of operation, that is to say, in which no vapors are conveyed by the pipe 25 to the column 24 and in which the alcohol passes into the column 24 merely by the pipe 23, the control, by means of the valve 21, is very sensitive, but the operation is expensive owing to the great steam consumption due to the revaporization of the alcohol in the column 24.

In the third mode of operation, in which the major portion of the alcohol is fed in the form of vapor by the pipe 25 to the column 24 and only sufficient alcohol is conveyed in the liquid form by the pipe 23 to the column 24 to allow an adjustment of reflux to the column 4 to be made by the valve 21, the most desirable conditions are obtained in that a comparatively low steam consumption is required. In carrying out the process in this way it will be understood that ordinarily the flow of water in the condenser 13 is set and the required adjustments are made by operating the valve 21. Owing to the ease of operation of the process in this way, furthermore, the cost of labor is low and the product obtained is uniform.

In the operation of the process it will be understood, also, that in the column 4 alcoholic vapors pass upwardly against a descending stream of alcohol which is rich in high boiling impurities, while the residual unvaporized impurities continue downwardly in contact with an ascending current of alcoholic vapors rich in low boiling impurities. Also, in the column 24 the liquid alcohol, including the alcohol withdrawn into the column 24 by means of the pipe 23, passes in a descending current against an ascending current of alcoholic vapors which are rich in low boiling impurities, the alcohol being drawn off at the bottom of the column where it is at its greatest purity, while the vapors which contain the low boiling impurities pass out through the pipe 30 at the point of their greatest concentration to be condensed thereafter and recovered.

While I have described my invention above in detail I wish it to be understood that many changes may be made therein without departing from the spirit of the same.

I claim:

1. The process which comprises distilling an aqueous liquid containing alcohol and lower boiling impurities, withdrawing liquid alcohol and alcohol vapor, both at a higher concentration than the liquid being distilled, from the materials evolved in the distilling operation, conveying the liquid alcohol and alcohol vapor containing lower boiling impurities to a column and distilling the same so as to remove lower boiling impurities therefrom while recovering alcohol therefrom substantially freed from such lower boiling impurities.

2. The process which comprises distilling an aqueous liquid containing alcohol and lower boiling impurities, withdrawing liquid alcohol and alcohol vapor, both at a higher concentration than the liquid being distilled, from the materials evolved in the distilling operation, but mainly in the form of vapor, conveying the liquid alcohol and alcohol vapor containing lower boiling impurities to a column and distilling the same so as to remove lower boiling impurities therefrom while recovering alcohol therefrom substantially freed from such lower boiling impurities.

3. The process which comprises distilling an aqueous liquid containing alcohol and lower boiling impurities, withdrawing liquid alcohol and alcohol vapor, both at a higher concentration than the liquid being distilled, from the materials evolved in the distilling operation, the liquid alcohol being obtained as a condensate while a portion of the latter is refluxed, conveying another portion of the liquid alcohol and alcohol vapor containing lower boiling impurities to a column and distilling the same so as to remove lower boiling impurities therefrom while recovering alcohol therefrom substantially freed from such lower boiling impurities.

4. The process which comprises distilling an aqueous liquid containing alcohol and lower boiling impurities, withdrawing liquid alcohol and alcohol vapor, both at a higher concentration than the liquid being distilled, from the materials evolved in the distilling operation, the liquid alcohol being obtained as a condensate while a portion of the latter is refluxed, but mainly in the form of vapor, conveying another portion of the liquid alcohol and alcohol vapor containing lower boiling impurities to a column and distilling the same so as to remove lower boiling impurities therefrom while recovering alcohol therefrom substantially freed from such lower boiling impurities.

5. The process which comprises distilling an aqueous liquid containing alcohol and lower boiling impurities, dephlegmating the vapors therefrom, withdrawing liquid alcohol and alcohol vapor, both at a higher concentration than the liquid being distilled, from the materials evolved in the distilling operation, the liquid alcohol being obtained as a condensate while a portion of the latter is refluxed, conveying another portion of the liquid alcohol and alcohol vapor containing lower boiling impurities to a column and distilling the same so as to remove lower boiling impurities therefrom while recovering alcohol therefrom substantially freed from such lower boiling impurities.

6. The process which comprises distilling an aqueous liquid containing alcohol and lower boiling impurities, dephlegmating the vapors therefrom, withdrawing liquid alcohol and alcohol vapor, both at a higher concentration than the liquid being distilled, from the materials evolved in the distilling operation, the liquid alcohol being obtained as a condensate while a portion of the latter is refluxed, but mainly in the form of vapor, conveying another portion of the liquid alcohol and alcohol vapor containing lower boiling impurities to a column and distilling the same so as to remove lower boiling impurities therefrom while recovering alcohol therefrom substantially freed from such lower boiling impurities.

7. The process which comprises distilling an aqueous liquid containing alcohol and lower boiling impurities, simultaneously dephlegmating the vapors therefrom and preheating said liquid by heat exchange between the same and said vapor, withdrawing liquid alcohol and alcohol vapor, both at a higher concentration than the liquid being distilled, from the materials evolved in the distilling operation, the liquid alcohol being obtained as a condensate while a portion of the latter is refluxed, conveying another portion of the liquid alcohol and alcohol vapor containing lower boiling impurities to a column and distilling the same so as to remove lower boiling impurities therefrom while recovering alcohol therefrom substantially freed from such lower boiling impurities.

8. The process which comprises distilling an aqueous liquid containing alcohol and lower boiling impurities, simultaneously dephlegmating the vapors therefrom and preheating said liquid by heat exchange between the same and said vapor, withdrawing liquid alcohol and alcohol vapor, both at a higher concentration than the liquid being distilled from the materials evolved in the distilling operation, the liquid alcohol being obtained as a condensate while a portion of the latter is refluxed, but mainly in the form of vapor, conveying another portion of the liquid alcohol and alcohol vapor containing lower boiling impurities to a column and distilling the same so as to remove lower boiling impurities therefrom while recovering alcohol therefrom substantially freed from such lower boiling impurities.

9. The process which comprises distilling an aqueous liquid containing alcohol and lower and higher boiling impurities, simultaneously dephlegmating the vapors therefrom and preheating said liquid by heat exchange between the same and said vapor, withdrawing liquid alcohol and alcohol vapor, both at a higher concentration than the liquid being distilled, from the materials evolved in the distilling operation, the liquid alcohol being obtained as a condensate while a portion of the latter is refluxed, but mainly as a vapor, conveying another portion of the liquid alcohol and alcohol vapor containing lower boiling impurities to a column and distilling the same so as to remove lower boiling impurities therefrom while recovering alcohol therefrom substantially freed from such lower boiling impurities, the first distillation being conducted so as to withdraw therefrom the higher boiling impurities.

In testimony that I claim the foregoing, I have hereunto set my hand this 6 day of January, 1925.

ELWOOD I. CLAPP.